(12) United States Patent
Kukreja

(10) Patent No.: US 11,050,847 B1
(45) Date of Patent: Jun. 29, 2021

(54) REPLICATION OF CONTROL PLANE METADATA

(71) Applicant: Amazon Technologies, Inc., Seattle, WA (US)

(72) Inventor: Dinesh Ramesh Kukreja, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/710,670

(22) Filed: Dec. 11, 2019

(51) Int. Cl.
| | |
|---|---|
| *G06F 16/27* | (2019.01) |
| *G06F 16/22* | (2019.01) |
| *G06F 16/23* | (2019.01) |
| *H04L 12/761* | (2013.01) |
| *H04L 12/773* | (2013.01) |
| *H04L 29/08* | (2006.01) |
| *H04L 12/24* | (2006.01) |

(52) U.S. Cl.
CPC .......... *H04L 67/34* (2013.01); *H04L 41/0246* (2013.01); *H04L 41/0846* (2013.01); *H04L 67/1095* (2013.01)

(58) Field of Classification Search
CPC . H04L 67/34; H04L 41/0246; H04L 41/0846; H04L 67/1095
See application file for complete search history.

(56) References Cited

U.S. PATENT DOCUMENTS

| | | | | |
|---|---|---|---|---|
| 2002/0147611 | A1* | 10/2002 | Greene | G06Q 10/063112 705/1.1 |
| 2002/0173984 | A1* | 11/2002 | Robertson | H04L 67/34 709/220 |
| 2011/0137991 | A1* | 6/2011 | Russell | G06Q 10/06 709/204 |
| 2013/0104251 | A1* | 4/2013 | Moore | G06F 21/602 726/30 |
| 2014/0223017 | A1* | 8/2014 | Lipstone | H04L 67/2885 709/226 |
| 2014/0344400 | A1* | 11/2014 | Varney | H04L 41/50 709/217 |
| 2014/0344413 | A1* | 11/2014 | Lipstone | H04L 41/5041 709/219 |
| 2017/0069009 | A1* | 3/2017 | Bursey | H04W 4/70 |

OTHER PUBLICATIONS

"Steven Tuttle, Ami Ehlenberger, Understanding LDAP, Design and Implementation, Jun. 2004, Second Edition, Version 5, All Chapters." (Year: 2004).*

* cited by examiner

*Primary Examiner* — Christopher B Robinson
(74) *Attorney, Agent, or Firm* — Nicholson De Vos Webster & Elliott LLP

(57) ABSTRACT

Techniques for replicating control plane metadata across regions are described. A method for replicating control plane metadata across regions may include receiving a request in a home region of a provider network to make a change to a cross-region service, receiving an event stream by a cross-region replication service, the event stream including the change to the cross-region service, and replicating, by the cross-region replication service, the change to the service in at least one of a plurality of expanded regions of the provider network, based on at least one attribute associated with the change in the event stream.

20 Claims, 9 Drawing Sheets

REPLICATION OF CONTROL PLANE METADATA

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for orchestration of directory management updates across regions. According to some embodiments, directory services can be replicated across regions of a provider network, enabling a customer's directory to be used to manage resources and users wherever those resources and users are located. To enable the directory service to operate in different regions, updates replicated across regions in a manner that complies with the security requirements or each region, such that these updates are provided in a secure, scalable, and isolated manner Additionally, control plane metadata also needs to be replicated. The metadata plays an important role to enable local reads, availability, and low latency across different directory service application programming interfaces which are used to describe existing directory metadata for an expanded directory in a remote region. Embodiments ensure that changes are replicated from the region in which the change was made to those regions which need to apply the changes.

Figure 1:
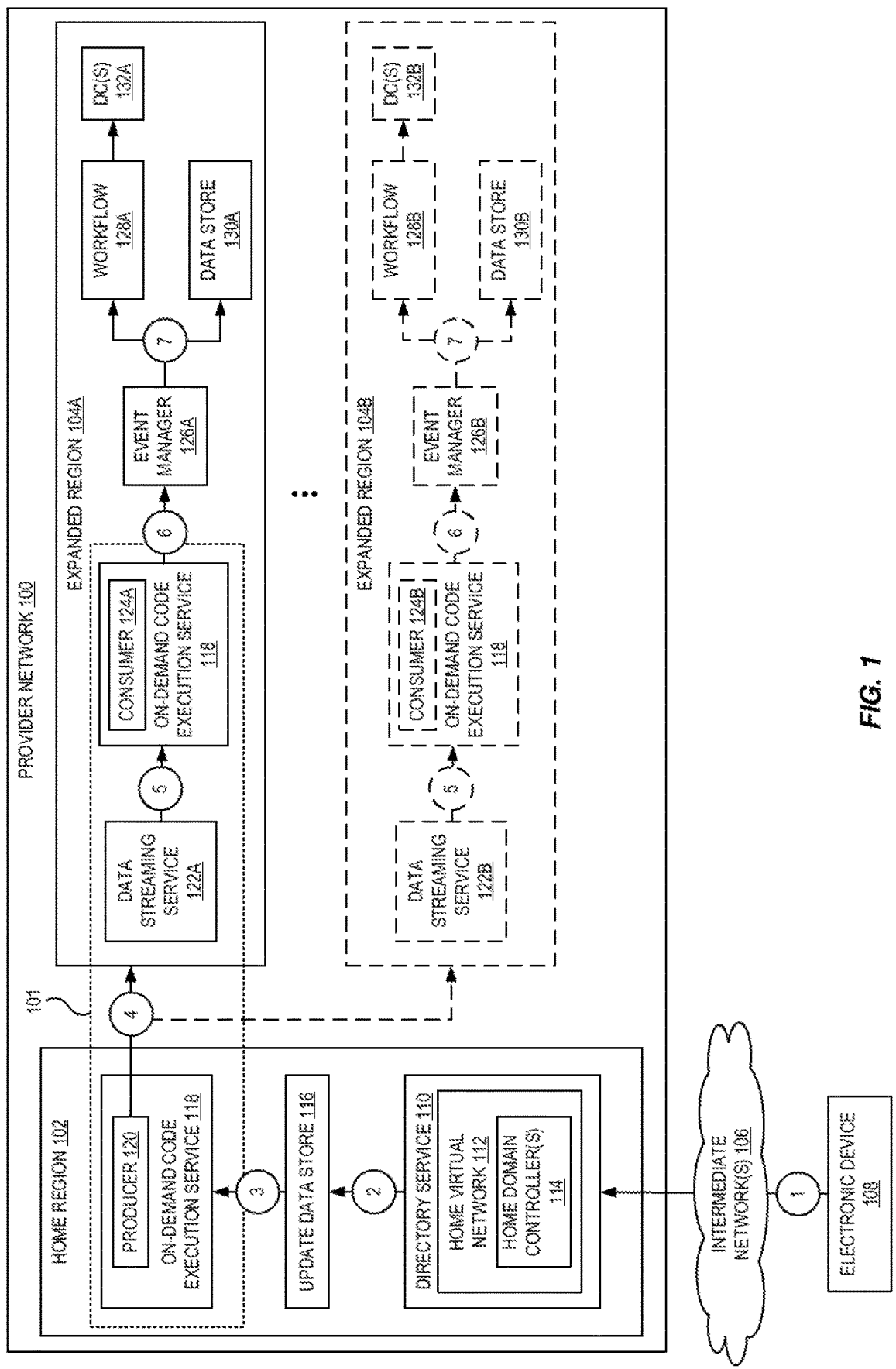
FIG. 1 is a diagram illustrating an environment for replicating control plane metadata across regions according to some embodiments.

FIG. 1 is a diagram illustrating an environment for replicating control plane metadata across regions according to some embodiments. Traditionally, directory services (e g, name services) have been limited to a single region. However, it is advantageous to expand single region resources, such as directory service 110, to multiple regions, to provide for disaster recovery, lower latency, higher availability, etc. Directory service 110 may provide various features, including global and regional features, that enable a customer to maintain and manage a directory. The directory service enables a customer to locate, manager and administer their network resources (e.g., storage volumes, files, network devices, users and groups, etc.) and may additionally provide features such as single sign on support, multifactor authentication, and other access control features. Although embodiments are discussed herein with respect to replicating changes to a directory service, embodiments may be used to replicate changes for any service across different regions of a provider network.

To keep the directory resources in sync, data needs to be replicated between regions. As shown in FIG. 1, a cross region replicator service 101 can manage cross region replication of changes. A request to make a change to the directory can be received by a directory service 110 in a home region 102 of provider network 100, at numeral 1. The request can be sent by a customer using electronic device 108 and may be received over one or more intermediate networks 106. In some embodiments, the request may include changing features, updating settings, or otherwise making changes to the customer's directory. These changes may be reflected as changes in control plane metadata or changes in settings data of the customer's directory. As shown, the customer's directory may include one or more home domain controllers 114 and may be implemented in a virtual network 112. To keep the directory in sync across multiple regions 104A-104B, this change needs to be propagated to the domain controllers 132A-132B in those other regions into which the directory has expanded.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

A cloud provider network can be formed as a number of regions, where a region may be a geographical area in which the cloud provider clusters data centers. Each region can include multiple (e.g., two or more) availability zones (AZs) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

In some embodiments, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

In various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Once an update is received by the directory service 110, it can be stored in an update data store 116 at numeral 2. Update data store can output a log stream (e.g., a changelog) that includes the previous value and the value that was changed in the update. In various embodiment, each entry in the log stream may also be associated with attribute which may include region data that indicates which expanded regions are to receive the update. In some embodiments, the update data store 116 may provide a uniform resource locator (URL) or other address that other services can use to consume this update stream. In some embodiments, there may be multiple update data stores and/or data structures within an update data store (e.g., tables or other data structures) which correspond to different settings or features of the directory service. In some embodiments, the update stream can be consumed by an on-demand code execution service 118 at numeral 3.

The on-demand code execution service can include at least one producer function 120 which processes the update stream received from the update data store 116. In some embodiments, a different producer function may be invoked for each update data store and/or data structure in use (e.g., each producer function receives update data from a different update data store or data structure associated with directory service 110 in home region 102). In some embodiments, the producer function 120 can filter each entry in the update stream to determine which regions the update needs to be replicated to based on the region data. At numeral 4, the producer function 120 can output the update from the update stream to each region determined to need the update. In some embodiments, each expanded region 104A-104B can include a data streaming service 122A-122B. The data streaming service receive data from the producer function and invoke a consumer function 124A-124B, respectively, to process the incoming update data, at numeral 5. In some embodiments, the data streaming service 122A-122B guarantees that update data will be processed in the order in which it is received from the producer function 120.

As shown in FIG. 1, each expanded region may include an event manager 126A-126B. In some embodiments, the event manager may be implemented as an application programming interface which is called by the consumer function 124A-124B to further process the incoming update data. In some embodiments, at numeral 7, the event manager can store the update data to a local data store 130A-130B, and invoke a workflow 128A-128B that corresponds to the update data. consumer lambda consumes the records in order and will invoke an API which will write the log data to a regional data store and launch a workflow for the event if needed. In some embodiments, the consumer function 124A-124B can be content neutral, and the event manager 126A-126B is responsible for determining what to do (e.g., what corresponding workflow to call) in response to the update data that has been received. The workflow can then apply the update to the domain controller(s) 132A-132B in each respective region to synchronize the domain controllers of the expanded region with those of the home region. In some embodiments, the event manager 126A-126B can analyze the update data to determine whether it needs to be applied. For example, the event manager can compare the value of the settings change to the current value of the corresponding setting of the local domain controllers. If the values match, then no update is required. In some embodiments, some settings may be regional. These settings may be associated with attributes that indicate that the value is regional and should not be modified based on a setting change in a different region. The event manager can determine whether the setting is associated with such attributes and, if so, ignore the update.

In some embodiments, if any non-retriable failures are encountered, the update data the received the non-retriable failure can be written to a queue or other data structure that can be reviewed by an administrator. In some embodiments, non-retriable failure may include if a region is not supported to receive update data if the event manager cannot accept the data or it is duplicative.

In some embodiments, each region may encrypt settings, events, or other data using a region-specific password or other credential. When the data is replicated to an expanded region, the expanded region cannot access the data because it does not know the regional password. As such, the expanded region's event manager can send a request to the region from which it received the data for the password to decrypt the data. In some embodiments, regions may publish an API for other regions to use when they need the region's password to access data received from the region. Once decrypted, the event manager can encrypt the data using a password (or other credential) specific to the expanded region before storing the encrypted data to the local data store.

In some embodiments, if concurrent updates are to be applied to an expanded region, this may result in a conflict. The event manager of the expanded region can send a request to the home region to resolve this conflict. For example, the home region may publish a conflict resolution API which may be called by an expanded region when a conflict is detected. The home region can then determine how to apply the conflicting updates. In some embodiments, the home region may choose to have the latest update be applied and any earlier updates be ignored. In some embodiments, a hierarchy of regions may be used to determine which update is to apply. For example, if a first conflicting update is from a first region and a second conflicting update is from a second region, the relative positions of the first region and the second region in the hierarchy may be used to determine which update to apply (e.g., the update from the superior region in the hierarchy may be applied).

Figure 2:
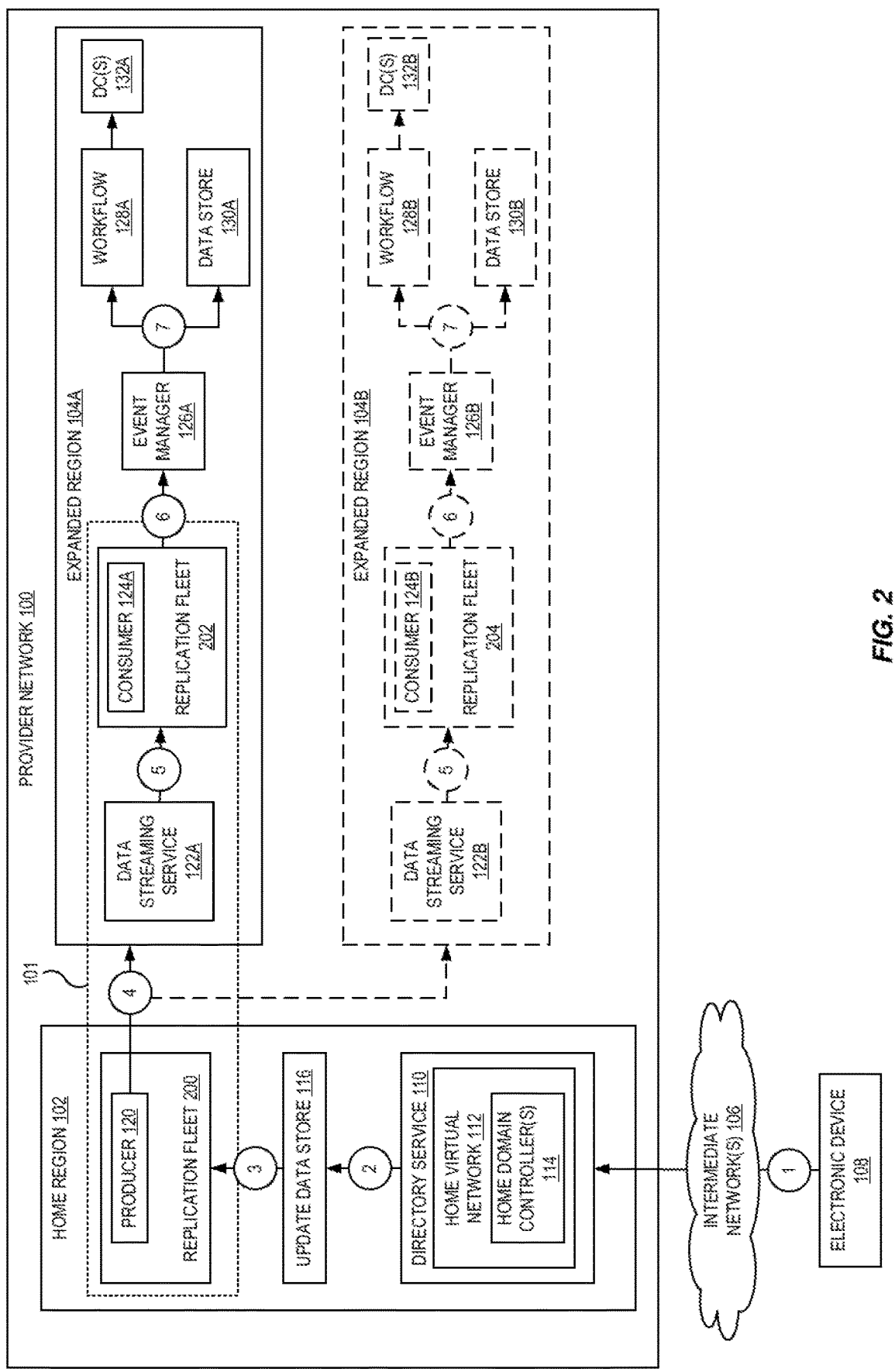
FIG. 2 is a diagram illustrating an alternative environment for replicating control plane metadata across regions according to some embodiments.

FIG. 2 is a diagram illustrating an alternative environment for replicating control plane metadata across regions according to some embodiments. As shown in FIG. 2, rather than utilizing an on-demand code execution service to perform replication, cross region replication service 101 may use dedicated replication fleets 200, 202, and 204 which host the producer 120 and consumer 124A-124B functions. Each replication fleet may include a plurality of host machines each configured to execute one or more instances of the producer function or consumer function. In some embodiments, each replication fleet may be configured to add hosts or remove hosts from the fleet based on current demand In some embodiments, each region may include its own replication fleet to host their respective producer or consumer functions. In the embodiment of FIG. 1, each producer and consumer are on-demand functions, which means the functions are started up when they are needed, executed, and then terminated. When the functions are needed again, they are started up from scratch, used, and then terminated again. This may add additional processing time to the replication process, leading to additional delay in replication. By implementing these functions on dedicated replication fleets, the processes may be running continuously, without the additional startup time, leading to less replication delay. Replication processing may otherwise proceed as discussed above with respect to FIG. 1.

Figure 3:
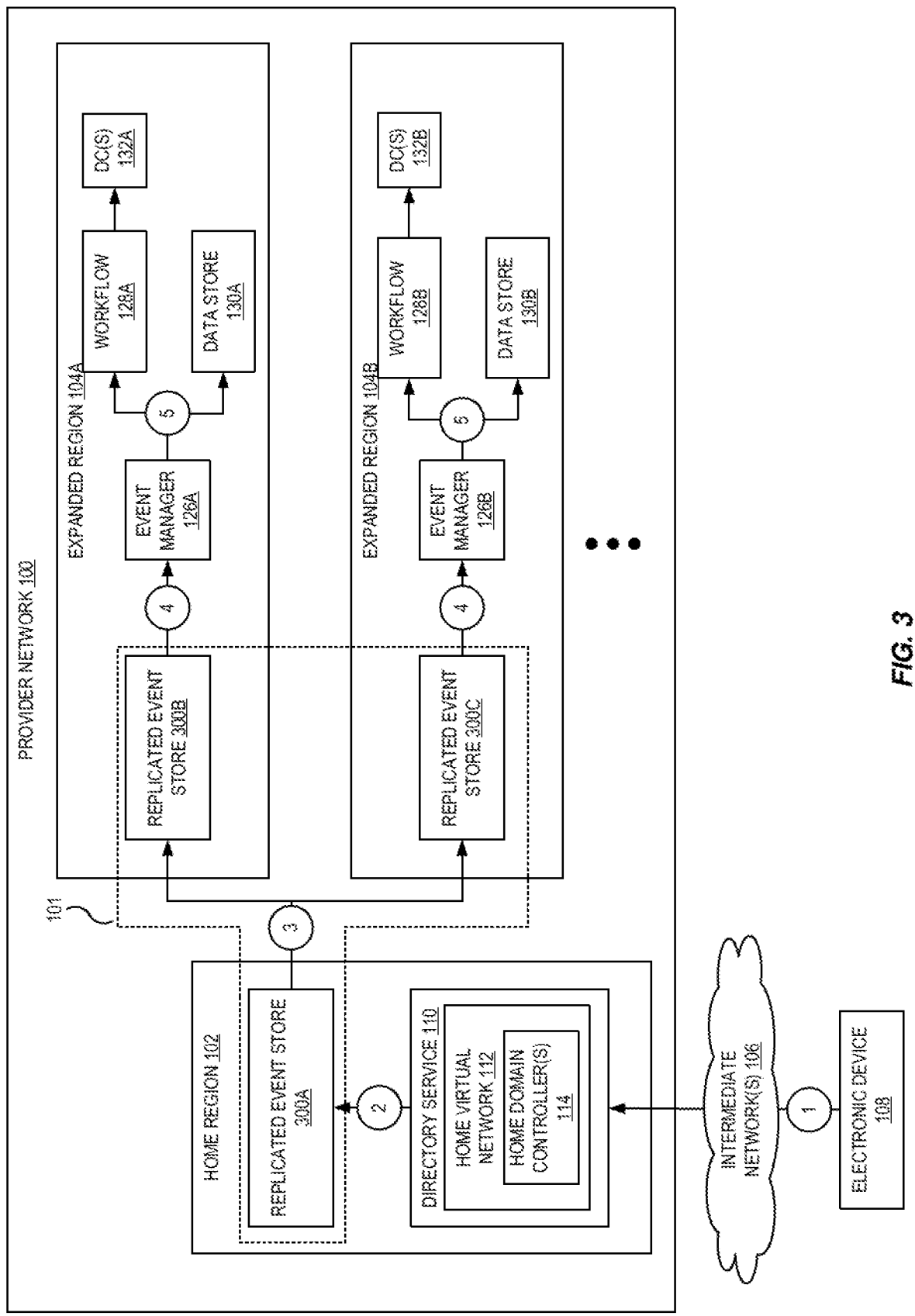
FIG. 3 is a diagram illustrating an environment for replicating control plane metadata across regions using replicated event data stores according to some embodiments.

FIG. 3 is a diagram illustrating an environment for replicating control plane metadata across regions using replicated event data stores according to some embodiments. As shown in FIG. 3, cross region replication service 101 may include a replicated event store 300A-300C provided in each region of the provider network, to replicate changes across regions of the provider network. Similar to the embodiments discussed above with respect to FIGS. 1 and 2, at numeral 1, a customer can send a request to the directory service 110 to make one or more changes to the settings of the directory. In the embodiment of FIG. 3, rather than using a producer function to consume settings changes and propagate those settings only to particular regions into which the customer has expanded their directory, the settings changes can be added to a replicated event store 300A, at numeral 2.

Replicated event store 300A may be configured to replicate all data that is stored in one instance, to corresponding instances 300B and 300C in every other region of the provider network, as shown at numeral 3. As a result, the settings data may be replicated to regions where it is not relevant. For example, if a customer has a directory that has been expanded to region 104A but not 104B, any changes the customer makes to their directory in home region 102 will still be replicated to both region 104A and 104B (along with any other regions of the provider network (not shown) that include an instance of the replicated data store). In some embodiments, the replicated event store can include an entry for each setting change made to the directory in the home region 102. Each entry may include an event type and time stamp along with region identifiers for each region that should apply the change.

At numeral 4, event manager 126A-126B can consume events from their respective replicated event store 300B-300C. Each event manager can parse the entries as they are received to identify whether their region is to apply the update. If the region is not to apply the update, then the event can be ignored. In some embodiments, the entry may include a status attribute. If the event is to be ignored, the status attribute can be updated to reflect that the change will not be applied (e.g., "ignored" or "complete" or other status update). If the event is to be applied to the region, then at numeral 5, the event manager can write the setting change associated with the event to a local data store 130A-103B and invoke a workflow 128A-128B to update the corresponding domain controllers 132A-132B accordingly.

Figure 4:
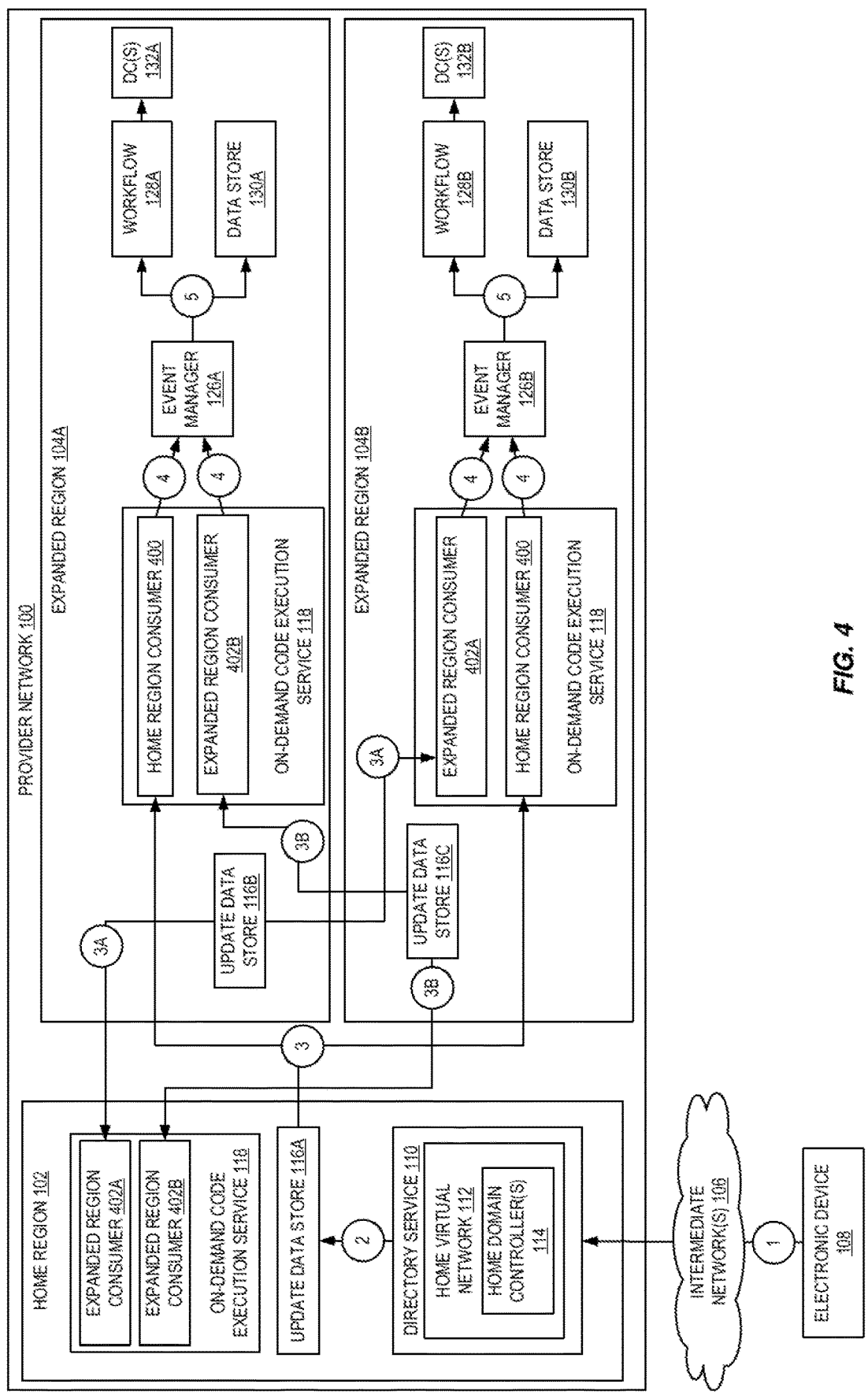
FIG. 4 is a diagram illustrating an environment for replicating control plane metadata across regions according to some embodiments.

FIG. 4 is a diagram illustrating an environment for replicating control plane metadata across regions according to some embodiments. As shown in FIG. 4, in some embodiments, each region may include its own update data store 116A-116C which includes any settings changes that are made in that region. Each update data store 116A-116C can output a log stream (e.g., a changelog) that includes the previous value and the value that was changed in the update. In the embodiments described above, this update stream may be consumed by a producer function which then manages replicating the change to other regions as appropriate. In the embodiment of FIG. 4, however, each region may be consuming the update stream of every other region. For example, the cross region replication service 101 may include the on-demand code execution service instances 118, and corresponding consumer functions, in each region.

For example, as shown in FIG. 4, when a customer requests that a settings change be made to their directory service, at numeral 1, the settings change can be logged in update data store 116A, at numeral 2. At numeral 3, update data store 116A outputs an update stream that is consumed by both expanded region 104A and expanded region 104B. In various embodiments, more or fewer regions may be consuming the update stream and two expanded regions are shown in the embodiment of FIG. 4 for simplicity of explanation.

Each region may include consumer functions that consume the update stream from one other region. For example, because the embodiment of FIG. 4 includes three regions (home region 102 and expanded regions 104A and 104B), each region includes two consumer functions. As shown, expanded region 104A includes a home region consumer 400 and an expanded region consumer 402B, corresponding to expanded region 104B. Similarly, expanded region 104B includes home region consumer 400 and an expanded region consumer 402A, corresponding to expanded region 104A. Home region 102 includes expanded region consumer 402A, corresponding to expanded region 104A, and expanded region consumer 402B, corresponding to expanded region 104B. If any changes are made in either expanded region, then the corresponding consumer functions in the other regions of the provider networks may consume the events streamed by the update data stores 116B and 116C, as shown at 3A and 3B, respectively. The event manager 126A-126B can receive the events from each consumer in its respective region at numeral 4, and process the events at numeral 5 similar to the processing described above with respect to FIGS. 1 and 2. Additionally, though not shown, home region 102 may also include an event manager that is processing any received events by expanded region consumers 402A and 402B and applying or discarding the corresponding changes.

Figure 5:
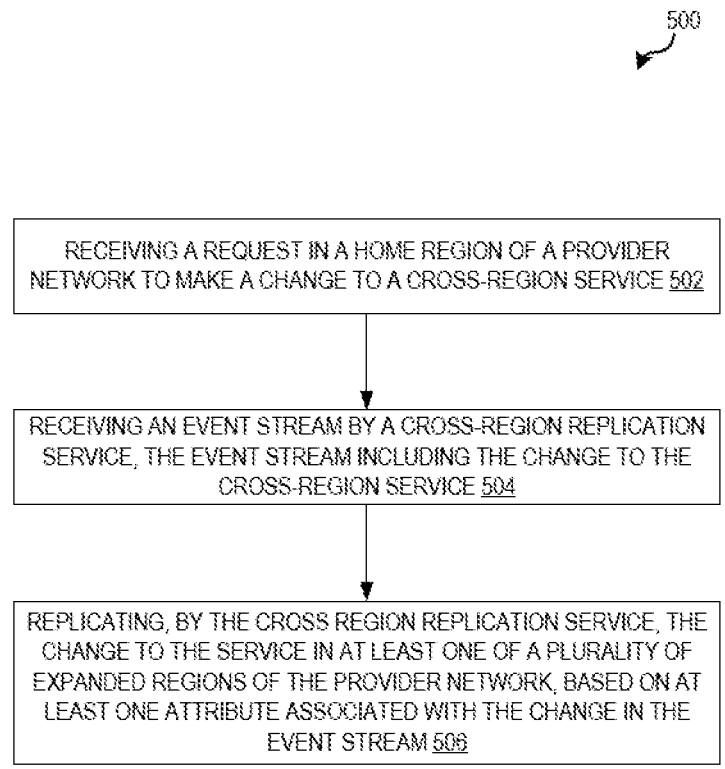
FIG. 5 is a flow diagram illustrating operations of a method for replicating control plane metadata across regions according to some embodiments.

FIG. 5 is a flow diagram illustrating operations 500 of a method for replicating control plane metadata across regions according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by directory service 110 or cross-region replication service 101 of the other figures.

The operations 500 include, at block 502, receiving a request in a home region of a provider network to make a change to a cross-region service. In some embodiments, the cross-region service is a directory service, and wherein the change is to settings data or control plane metadata associated with the directory service. The operations 500 further include, at block 504, receiving an event stream by a cross-region replication service, the event stream including the change to the cross-region service.

The operations 500 further include, at block 506, replicating, by the cross-region replication service, the change to the service in at least one of a plurality of expanded regions of the provider network, based on at least one attribute associated with the change in the event stream. In some embodiments, the operations may further include storing the change to a data store in the home region, wherein the data store outputs the event stream that includes the change, and replicating may further include receiving the event stream by a producer function, the producer function to determine one or more regions of the plurality of expanded regions to which to replicate the change, adding the change to a data streaming service in each of the one or more regions of the provider network, and receiving an output of the data streaming service by a consumer function, the consumer function to provide the change to an event manager.

In some embodiments, the operations may further include determining, by the event manager, a workflow to call to apply the change to the service, based on the at least one attribute associated with the change, calling the workflow to apply the change to the service, and storing the change to a local data store. In some embodiments, the producer function and the consumer function are each implemented on a replication fleet in each region of the provider network, the replication fleet comprising a plurality of host machines. In some embodiments, the producer function and the consumer function are each implemented as on-demand functions maintained by an on-demand code execution service.

In some embodiments, replicating, by the cross-region replication service, the change to the service in at least one of a plurality of expanded regions of the provider network, based on at least one attribute associated with the change in the event stream, further comprises storing the change to a replicated event store in the region, wherein the replicated event store replicates the change to an instance of the replicated event store in each of the plurality of regions of the provider network, determining, by an event manager in a first expanded region from the plurality of expanded regions, that a new event has been added to the replicated event store, determining, by the event manager, that the change to be applied to the first expanded region, based on one or more attributes associated with the change, determining, by the event manager, a workflow associated with the change, and calling the workflow to apply the change to the first expanded region.

In some embodiments, replicating, by the cross-region replication service, the change to the service in at least one of a plurality of expanded regions of the provider network, based on at least one attribute associated with the change in the event stream, further comprises storing the change to a replicated event store in the region, wherein the replicated event store replicates the change to an instance of the replicated event store in each of the plurality of regions of the provider network, determining, by an event manager in a first expanded region from the plurality of expanded regions, that a new event has been added to the replicated event store, determining, by the event manager, that the change is not to be applied to the first expanded region based on one or more attributes associated with the change, and ignoring the change.

In some embodiments, replicating, by the cross-region replication service, the change to the service in at least one of a plurality of expanded regions of the provider network, based on at least one attribute associated with the change in the event stream, further comprises storing the change to a data store in the home region, wherein the data store outputs the event stream that includes the change, receiving the event stream by a consumer function in each of the plurality of expanded regions, wherein the home region and each region of the plurality of expanded regions includes a consumer function corresponding to every other region in the provider network, each consumer function to provide the change to an event manager, determining, by the event manager, a workflow to call to apply the change to the service, based on the at least one attribute associated with the change, calling the workflow to apply the change to the service, and storing the change to a local data store.

In some embodiments, the operations may include receiving a request in a home region of a provider network to change a setting of a cross-region directory service, storing the setting change to a data store in the home region, wherein the data store outputs a changelog including the setting change and a previous value of the setting, receiving the changelog by a producer function of cross-region replication service in the home region, the producer function to determine one or more regions of a plurality of expanded regions of the provider network to which to replicate the change, adding an event corresponding to the changelog to a data streaming service in each of the one or more regions, receiving an output of the data streaming service by a consumer function in a first region from the one or more regions, the consumer function to provide the event to an event manager, determining, by the event manager, a workflow to call to apply the setting change to the directory service, based on at least one attribute associated with the event, calling the workflow to apply the setting change to the directory service, and storing the setting change to a local data store in the first region. In some embodiments, the operations may further include receiving a request for a home region password to decrypt the event, and providing the home region password to the event manager to decrypt the event, wherein the event manager encrypts the setting change using a first region password before storing the setting change to the local data store. In some embodiments, each event is associated with attributes that indicate the one or more regions to which the setting change is to be replicated, the one or more regions corresponding to regions into which the directory service has been expanded.

Figure 6:
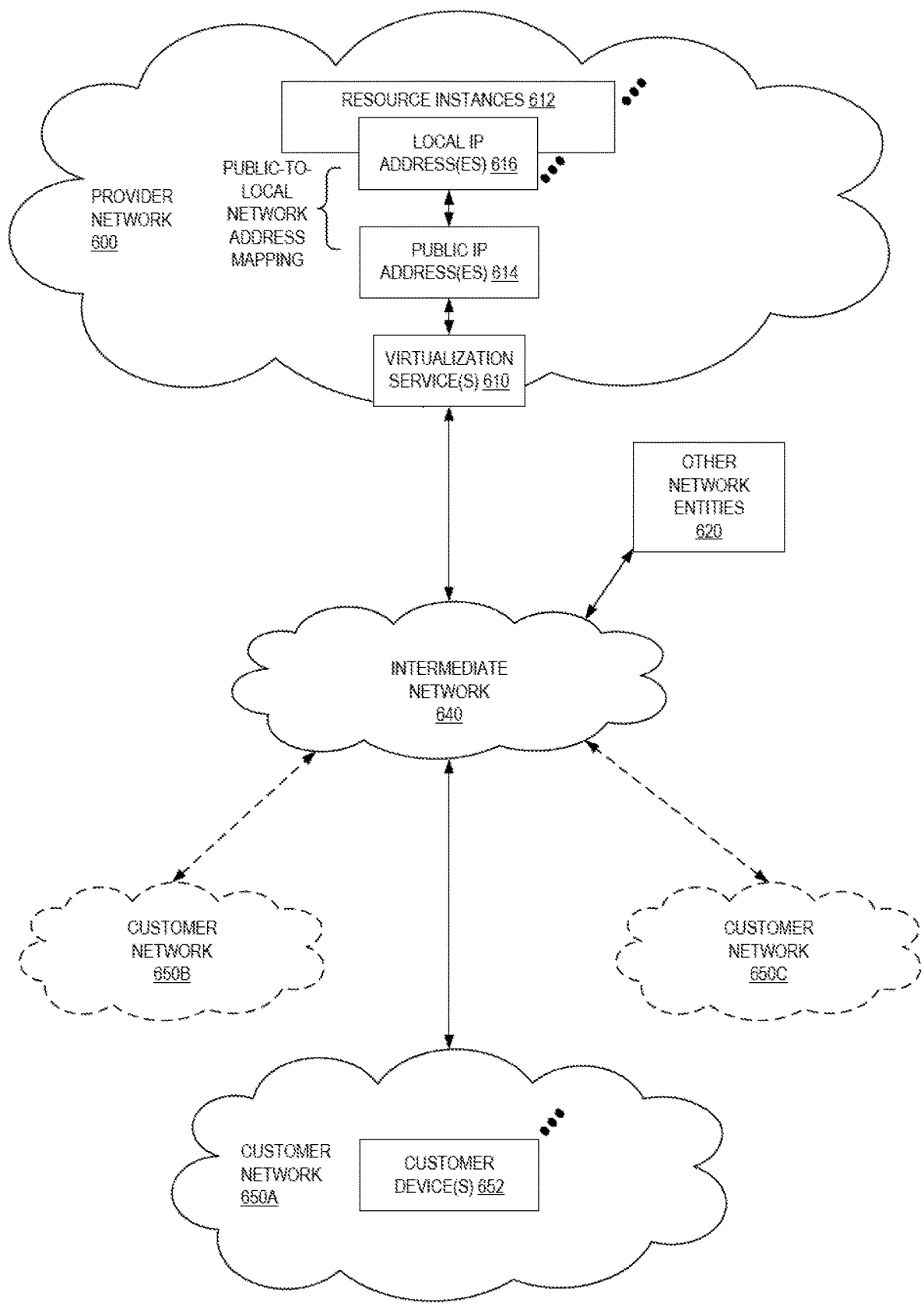
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
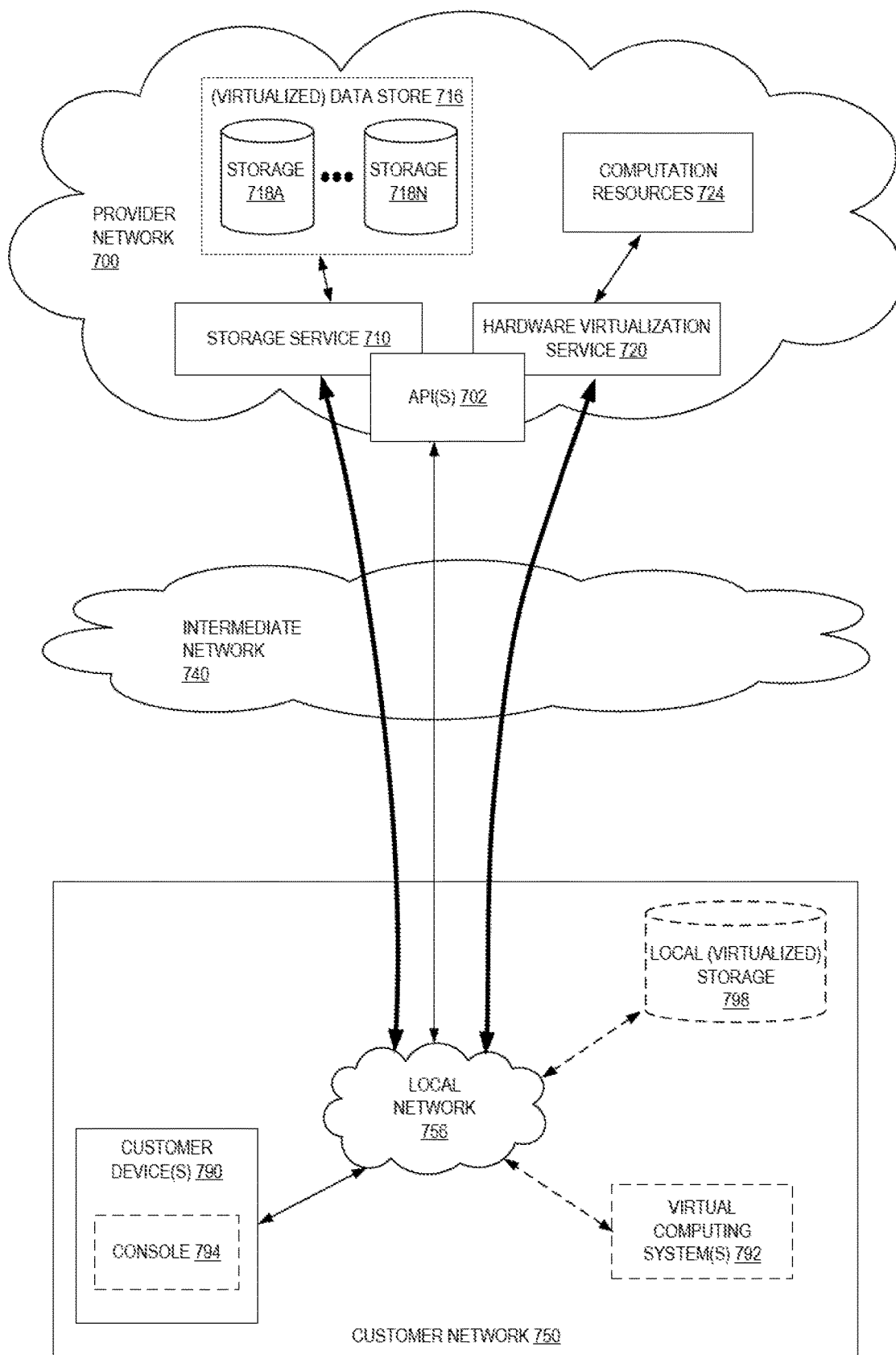
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
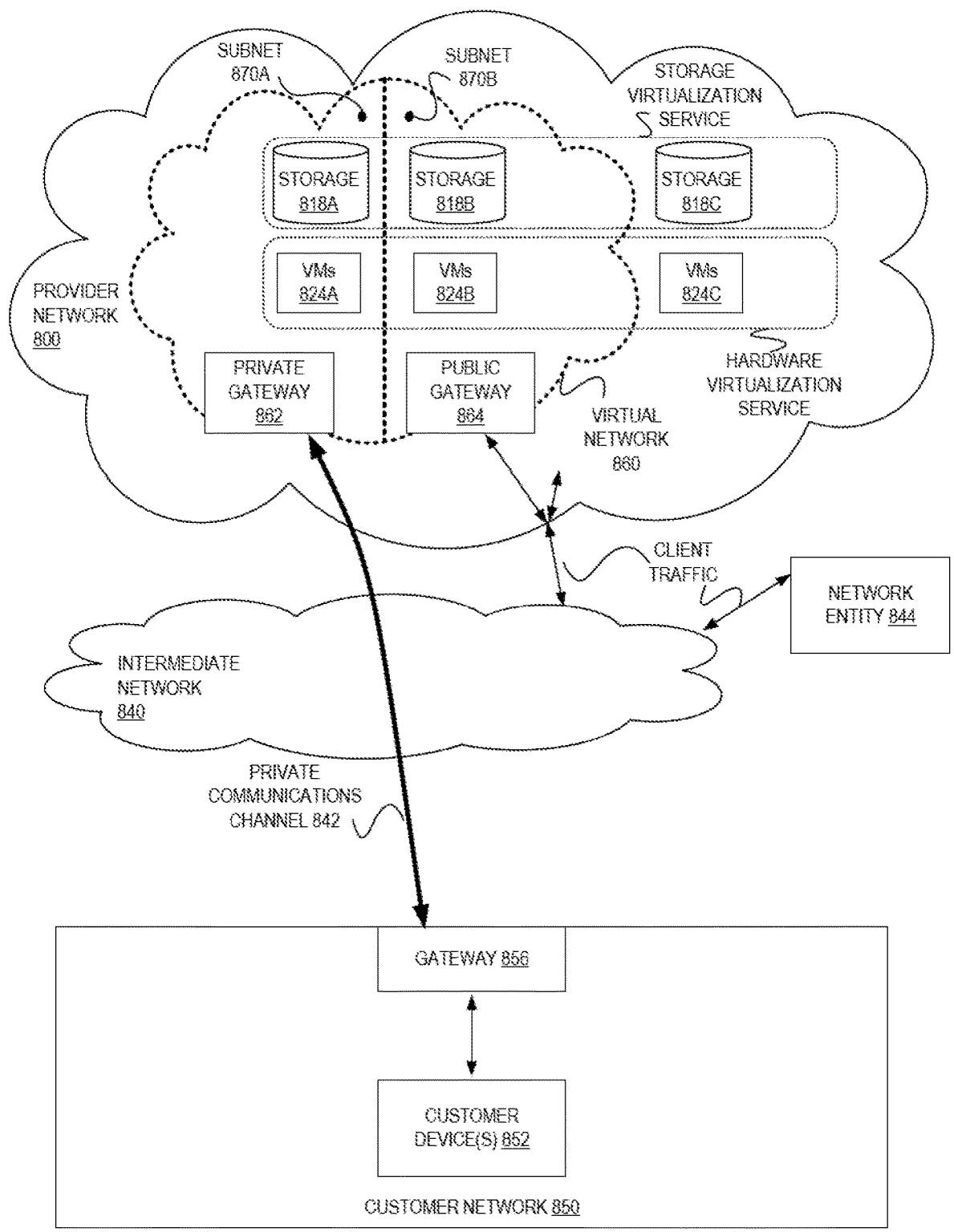
FIG. 8 illustrates an example provider network that provides virtual networks on the provider network to at least some customers, according to some embodiments.

FIG. 8 illustrates an example provider network that provides virtual networks on the provider network to at least some customers, according to some embodiments. A customer's virtual network 860 on a provider network 800, for example, enables a customer to connect their existing infrastructure (e.g., one or more customer devices 852) on customer network 850 to a set of logically isolated resource instances (e.g., VMs 824A and 824B and storage 818A and 818B), and to extend management capabilities such as security services, firewalls, and intrusion detection systems to include their resource instances.

A customer's virtual network 860 may be connected to a customer network 850 via a private communications channel 842. A private communications channel 842 may, for example, be a tunnel implemented according to a network tunneling technology or some other technology over an intermediate network 840. The intermediate network may, for example, be a shared network or a public network such as the Internet. Alternatively, a private communications channel 842 may be implemented over a direct, dedicated connection between virtual network 860 and customer network 850.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 860 for a customer on provider network 800, one or more resource instances (e.g., VMs 824A and 824B and storage 818A and 818B) may be allocated to the virtual network 860. Note that other resource instances (e.g., storage 818C and VMs 824C) may remain available on the provider network 800 for other customer usage. A range of public IP addresses may also be allocated to the virtual network 860. In addition, one or more networking nodes (e.g., routers, switches, etc.) of the provider network 800 may be allocated to the virtual network 860. A private communications channel 842 may be established between a private gateway 862 at virtual network 860 and a gateway 856 at customer network 850.

In some embodiments, in addition to, or instead of, a private gateway 862, virtual network 860 may include a public gateway 864 that enables resources within virtual network 860 to communicate directly with entities (e.g., network entity 844) via intermediate network 840, and vice versa, instead of or in addition to via private communications channel 842.

Virtual network 860 may be, but is not necessarily, subdivided into two or more subnetworks, or subnets, 870. For example, in implementations that include both a private gateway 862 and a public gateway 864, a virtual network 860 may be subdivided into a subnet 870A that includes resources (VMs 824A and storage 818A, in this example) reachable through private gateway 862, and a subnet 870B that includes resources (VMs 824B and storage 818B, in this example) reachable through public gateway 864.

The customer may assign particular customer public IP addresses to particular resource instances in virtual network 860. A network entity 844 on intermediate network 840 may then send traffic to a public IP address published by the customer; the traffic is routed, by the provider network 800, to the associated resource instance. Return traffic from the resource instance is routed, by the provider network 800, back to the network entity 844 over intermediate network 840. Note that routing traffic between a resource instance and a network entity 844 may require network address translation to translate between the public IP address and the local IP address of the resource instance.

Some embodiments may allow a customer to remap public IP addresses in a customer's virtual network 860 as illustrated in FIG. 8 to devices on the customer's external network 850. When a packet is received (e.g., from network entity 844), the network 800 may determine that the destination IP address indicated by the packet has been remapped to an endpoint on external network 850 and handle routing of the packet to the respective endpoint, either via private communications channel 842 or via the intermediate network 840. Response traffic may be routed from the endpoint to the network entity 844 through the provider network 800, or alternatively may be directly routed to the network entity 844 by the customer network 850. From the perspective of the network entity 844, it appears as if the network entity 844 is communicating with the public IP address of the customer on the provider network 800. However, the network entity 844 has actually communicated with the endpoint on customer network 850.

While FIG. 8 shows network entity 844 on intermediate network 840 and external to provider network 800, a network entity may be an entity on provider network 800. For example, one of the resource instances provided by provider network 800 may be a network entity that sends traffic to a public IP address published by the customer.

Illustrative Systems

Figure 9:
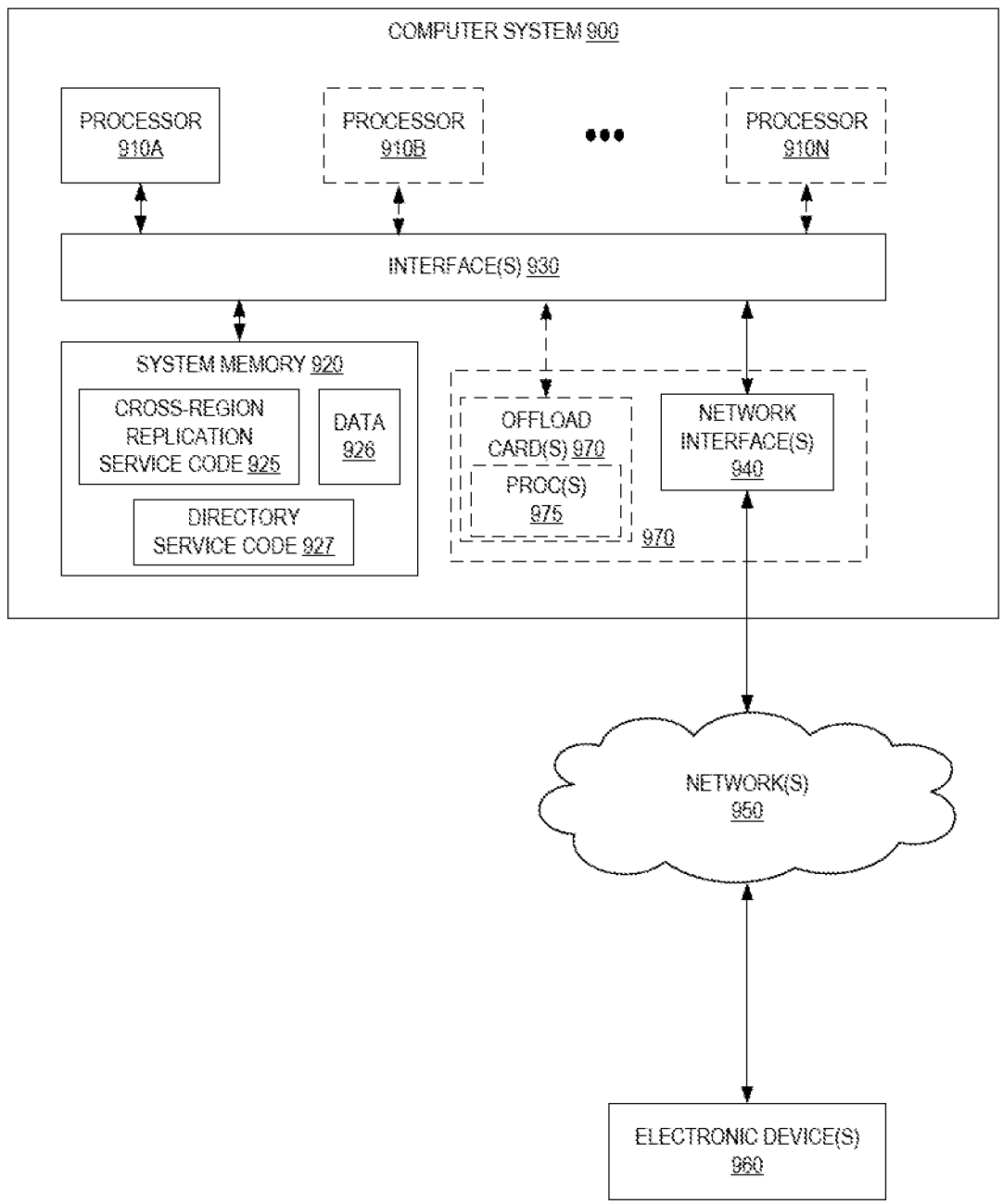
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as cross-region replication service code 925, directory service code 927, and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request in a home region of a provider network to change a setting of a cross-region directory service;
   storing the setting change to a data store in the home region, wherein the data store outputs a changelog including the setting change and a previous value of the setting;
   receiving the changelog by a producer function of cross-region replication service in the home region, the producer function to determine one or more regions of a plurality of expanded regions of the provider network to which to replicate the change;
   adding an event corresponding to the changelog to a data streaming service in each of the one or more regions;
   receiving an output of the data streaming service by a consumer function in a first region from the one or more regions, the consumer function to provide the event to an event manager;
   determining, by the event manager, a workflow to call to apply the setting change to the directory service, based on at least one attribute associated with the event;
   calling the workflow to apply the setting change to the directory service; and
   storing the setting change to a local data store in the first region.

2. The computer-implemented method of claim 1, further comprising:
   receiving a request for a home region password to decrypt the event; and
   providing the home region password to the event manager to decrypt the event, wherein the event manager encrypts the setting change using a first region password before storing the setting change to the local data store.

3. The computer-implemented method of claim 1, wherein each event is associated with attributes that indicate the one or more regions to which the setting change is to be replicated, the one or more regions corresponding to regions into which the directory service has been expanded.

4. A computer-implemented method comprising:
receiving a request in a home region of a provider network to make a change to a cross-region service;
receiving an event stream by a cross-region replication service, the event stream including the change to the cross-region service; and
replicating, by the cross-region replication service, the change to the service in at least one of a plurality of expanded regions of the provider network, based on at least one attribute associated with the change in the event stream.

5. The computer-implemented method of claim 4, further comprising:
storing the change to a data store in the home region, wherein the data store outputs the event stream that includes the change;
wherein replicating, by the cross-region replication service, the change to the service in at least one of a plurality of expanded regions of the provider network, based on at least one attribute associated with the change in the event stream, further comprises:
receiving the event stream by a producer function, the producer function to determine one or more regions of the plurality of expanded regions to which to replicate the change;
adding the change to a data streaming service in each of the one or more regions of the provider network; and
receiving an output of the data streaming service by a consumer function, the consumer function to provide the change to an event manager.

6. The computer-implemented method of claim 5, further comprising:
determining, by the event manager, a workflow to call to apply the change to the service, based on the at least one attribute associated with the change;
calling the workflow to apply the change to the service; and
storing the change to a local data store.

7. The computer-implemented method of claim 5, wherein the producer function and the consumer function are each implemented on a replication fleet in each region of the provider network, the replication fleet comprising a plurality of host machines.

8. The computer-implemented method of claim 5, wherein the producer function and the consumer function are each implemented as on-demand functions maintained by an on-demand code execution service.

9. The computer-implemented method of claim 4, wherein replicating, by the cross-region replication service, the change to the service in at least one of a plurality of expanded regions of the provider network, based on at least one attribute associated with the change in the event stream, further comprises:
storing the change to a replicated event store in the region, wherein the replicated event store replicates the change to an instance of the replicated event store in each of the plurality of regions of the provider network;
determining, by an event manager in a first expanded region from the plurality of expanded regions, that a new event has been added to the replicated event store;
determining, by the event manager, that the change to be applied to the first expanded region, based on one or more attributes associated with the change;
determining, by the event manager, a workflow associated with the change; and
calling the workflow to apply the change to the first expanded region.

10. The computer-implemented method of claim 4, wherein replicating, by the cross-region replication service, the change to the service in at least one of a plurality of expanded regions of the provider network, based on at least one attribute associated with the change in the event stream, further comprises:
storing the change to a replicated event store in the region, wherein the replicated event store replicates the change to an instance of the replicated event store in each of the plurality of regions of the provider network;
determining, by an event manager in a first expanded region from the plurality of expanded regions, that a new event has been added to the replicated event store;
determining, by the event manager, that the change is not to be applied to the first expanded region based on one or more attributes associated with the change; and
ignoring the change.

11. The computer-implemented method of claim 4, wherein replicating, by the cross-region replication service, the change to the service in at least one of a plurality of expanded regions of the provider network, based on at least one attribute associated with the change in the event stream, further comprises:
storing the change to a data store in the home region, wherein the data store outputs the event stream that includes the change;
receiving the event stream by a consumer function in each of the plurality of expanded regions, wherein the home region and each region of the plurality of expanded regions includes a consumer function corresponding to every other region in the provider network, each consumer function to provide the change to an event manager;
determining, by the event manager, a workflow to call to apply the change to the service, based on the at least one attribute associated with the change;
calling the workflow to apply the change to the service; and
storing the change to a local data store.

12. The computer-implemented method of claim 4, wherein the cross-region service is a directory service, and wherein the change is to settings data or control plane metadata associated with the directory service.

13. A system comprising:
a directory service implemented by a first one or more electronic devices; and
a cross-region replication service implemented by a second one or more electronic devices, the cross-region replication service including instructions that upon execution cause the cross-region replication service to:
receive a request in a home region of a provider network to make a change to a cross-region service;
receive an event stream, the event stream including the change to the cross-region service; and
replicate the change to the service in at least one of a plurality of expanded regions of the provider network, based on at least one attribute associated with the change in the event stream.

14. The system of claim 13, wherein the instructions, when executed, further cause the cross-region replication service to:

store the change to a data store in the home region, wherein the data store outputs the event stream that includes the change;

wherein to replicate the change to the service in at least one of a plurality of expanded regions of the provider network, based on at least one attribute associated with the change in the event stream, the instructions, when executed, further cause the cross-region replication service to:

receive the event stream by a producer function, the producer function to determine one or more regions of the plurality of expanded regions to which to replicate the change;

add the change to a data streaming service in each of the one or more regions of the provider network; and receive an output of the data streaming service by a consumer function, the consumer function to provide the change to an event manager.

15. The system of claim 14, wherein the instructions, when executed, further cause the cross-region replication service to:

determine, by the event manager, a workflow to call to apply the change to the service, based on the at least one attribute associated with the change;

call the workflow to apply the change to the service; and store the change to a local data store.

16. The system of claim 14, wherein the producer function and the consumer function are each implemented on a replication fleet in each region of the provider network, the replication fleet comprising a plurality of host machines.

17. The system of claim 14, wherein the producer function and the consumer function are each implemented as on-demand functions maintained by an on-demand code execution service.

18. The system of claim 13, wherein to replicate the change to the service in at least one of a plurality of expanded regions of the provider network, based on at least one attribute associated with the change in the event stream, the instructions, when executed, further cause the cross-region replication service to:

store the change to a replicated event store in the region, wherein the replicated event store replicates the change to an instance of the replicated event store in each of the plurality of regions of the provider network;

determine, by an event manager in a first expanded region from the plurality of expanded regions, that a new event has been added to the replicated event store;

determine, by the event manager, that the change to be applied to the first expanded region, based on one or more attributes associated with the change;

determine, by the event manager, a workflow associated with the change; and call the workflow to apply the change to the first expanded region.

19. The system of claim 13, wherein to replicate the change to the service in at least one of a plurality of expanded regions of the provider network, based on at least one attribute associated with the change in the event stream, the instructions, when executed, further cause the cross-region replication service to:

store the change to a replicated event store in the region, wherein the replicated event store replicates the change to an instance of the replicated event store in each of the plurality of regions of the provider network;

determine, by an event manager in a first expanded region from the plurality of expanded regions, that a new event has been added to the replicated event store;

determine, by the event manager, that the change is not to be applied to the first expanded region based on one or more attributes associated with the change; and ignore the change.

20. The system of claim 13, wherein to replicate the change to the service in at least one of a plurality of expanded regions of the provider network, based on at least one attribute associated with the change in the event stream, the instructions, when executed, further cause the cross-region replication service to:

store the change to a data store in the home region, wherein the data store outputs the event stream that includes the change;

receive the event stream by a consumer function in each of the plurality of expanded regions, wherein the home region and each region of the plurality of expanded regions includes a consumer function corresponding to every other region in the provider network, each consumer function to provide the change to an event manager;

determine, by the event manager, a workflow to call to apply the change to the service, based on the at least one attribute associated with the change;

call the workflow to apply the change to the service; and store the change to a local data store.

* * * * *